US011319469B2

(12) United States Patent
Martinelli et al.

(10) Patent No.: US 11,319,469 B2
(45) Date of Patent: May 3, 2022

(54) METHOD FOR PREPARING AN ADHESIVE POLYOLEFIN, ADHESIVE POLYOLEFIN, USE THEREOF, AND MANUFACTURED ARTICLE

(71) Applicant: Braskem S.A., Camaçari (BR)

(72) Inventors: Carolina Barreto Roma Martinelli, São Caetano do Sul—SP (BR); Marcelo Farah, Porto Alegre—RS (BR)

(73) Assignee: Braskem S.A., Camaçari (BR)

( * ) Notice: Subject to any disclaimer, the term of this patent is extended or adjusted under 35 U.S.C. 154(b) by 276 days.

(21) Appl. No.: 14/441,060

(22) PCT Filed: Nov. 6, 2012

(86) PCT No.: PCT/BR2012/000431
§ 371 (c)(1),
(2) Date: May 6, 2015

(87) PCT Pub. No.: WO2014/071470
PCT Pub. Date: May 15, 2014

(65) Prior Publication Data
US 2015/0299528 A1    Oct. 22, 2015

(51) Int. Cl.
*C09J 131/04* (2006.01)
*B29C 48/00* (2019.01)
(Continued)

(52) U.S. Cl.
CPC ........... *C09J 131/04* (2013.01); *B29C 35/045* (2013.01); *B29C 48/002* (2019.02); *B29C 48/0012* (2019.02); *B29C 48/0018* (2019.02); *B29C 48/154* (2019.02); *B29C 48/18* (2019.02); *B29C 48/21* (2019.02); *B29C 48/22* (2019.02); *B29C 71/04* (2013.01); *B32B 5/18* (2013.01); *B32B 7/12* (2013.01); *B32B 27/065* (2013.01);
(Continued)

(58) Field of Classification Search
CPC ...... C09J 131/00; B29C 47/06; B29C 47/065; B29C 44/14; B29C 44/12; B29C 44/145
See application file for complete search history.

(56) References Cited

U.S. PATENT DOCUMENTS 3,673,050 A * 6/1972 Newman, Jr. ........... B32B 27/00
428/214
3,829,343 A 8/1974 Remmert
(Continued)

FOREIGN PATENT DOCUMENTS

GB     976382    11/1964
GB    1127600    9/1968
(Continued)

*Primary Examiner* — Galen H Hauth
(74) *Attorney, Agent, or Firm* — Duane Morris LLP

(57) ABSTRACT

The present invention refers to co-extrusion of one or more polyolefins with one or more adhesive layers to improve the adhesiveness of the polyolefins in metal, epoxy resin, glass, ceramics, paper, wood, thermoplastic resin, fabric, non-woven fabric, varnishes and formica.
More specifically, the present invention refers to a method of co-extruding at least one polyolefin with an adhesive layer, thereby enhancing the adhesion properties of the polyolefin, particularly in polyurethane foams such that a polar surface is imparted to the obtained adhesived polyolefin.

10 Claims, 3 Drawing Sheets

(51) Int. Cl.

| | | |
|---|---|---|
| *B29C 48/21* | (2019.01) | |
| *B32B 27/32* | (2006.01) | |
| *C08F 255/08* | (2006.01) | |
| *C09J 123/08* | (2006.01) | |
| *C08L 23/08* | (2006.01) | |
| *C09J 151/06* | (2006.01) | |
| *B32B 7/12* | (2006.01) | |
| *B32B 27/06* | (2006.01) | |
| *B32B 27/30* | (2006.01) | |
| *B32B 27/16* | (2006.01) | |
| *B32B 5/18* | (2006.01) | |
| *B32B 27/20* | (2006.01) | |
| *B29C 48/18* | (2019.01) | |
| *B29C 48/22* | (2019.01) | |
| *B29C 48/154* | (2019.01) | |
| *B29C 35/04* | (2006.01) | |
| *B29C 71/04* | (2006.01) | |
| *B32B 27/08* | (2006.01) | |
| *C09J 123/12* | (2006.01) | |
| *B29K 96/02* | (2006.01) | |
| *B29C 43/24* | (2006.01) | |
| *B29C 43/30* | (2006.01) | |
| *B29K 23/00* | (2006.01) | |
| *B29K 105/00* | (2006.01) | |
| *B29L 7/00* | (2006.01) | |
| *B29L 9/00* | (2006.01) | |

(52) U.S. Cl.
CPC .............. *B32B 27/08* (2013.01); *B32B 27/16* (2013.01); *B32B 27/20* (2013.01); *B32B 27/304* (2013.01); *B32B 27/306* (2013.01); *B32B 27/308* (2013.01); *B32B 27/32* (2013.01); *B32B 27/322* (2013.01); *C08F 255/08* (2013.01); *C08L 23/08* (2013.01); *C09J 123/08* (2013.01); *C09J 123/12* (2013.01); *C09J 151/06* (2013.01); *B29C 43/24* (2013.01); *B29C 43/30* (2013.01); *B29K 2023/06* (2013.01); *B29K 2023/083* (2013.01); *B29K 2023/12* (2013.01); *B29K 2096/02* (2013.01); *B29K 2105/0097* (2013.01); *B29L 2007/00* (2013.01); *B29L 2009/00* (2013.01); *B32B 2266/0278* (2013.01); *B32B 2270/00* (2013.01); *B32B 2307/102* (2013.01); *B32B 2307/304* (2013.01); *B32B 2307/51* (2013.01); *B32B 2307/714* (2013.01); *B32B 2307/72* (2013.01); *B32B 2405/00* (2013.01)

(56) References Cited

U.S. PATENT DOCUMENTS

| | | | |
|---|---|---|---|
| 4,500,596 A | 2/1985 | Lee | |
| 4,659,618 A | 4/1987 | Yazaki et al. | |
| 4,690,679 A * | 9/1987 | Mattingly, III | A61F 13/512 604/383 |
| 5,660,922 A * | 8/1997 | Herridge | B29C 47/0021 428/214 |
| 5,834,126 A | 11/1998 | Sheu | |
| 2001/0046587 A1* | 11/2001 | Michael | B32B 3/266 428/137 |
| 2004/0265361 A1* | 12/2004 | Kuniya | A61L 15/585 424/445 |
| 2005/0170189 A1* | 8/2005 | Haas | B29C 44/12 428/423.1 |
| 2007/0160793 A1* | 7/2007 | Cageao | B62D 25/2054 428/36.9 |
| 2009/0226747 A1* | 9/2009 | Arber | C09J 5/02 428/480 |
| 2012/0070661 A1* | 3/2012 | Ikishima | C09J 7/0246 428/355 EN |

FOREIGN PATENT DOCUMENTS

| | | |
|---|---|---|
| GB | 1139350 | 1/1969 |
| GB | 1 453 872 | 10/1976 |
| GB | 1 488 701 | 10/1977 |

* cited by examiner

METHOD FOR PREPARING AN ADHESIVE POLYOLEFIN, ADHESIVE POLYOLEFIN, USE THEREOF, AND MANUFACTURED ARTICLE

FIELD OF THE INVENTION

The present invention refers to the co-extrusion of one or more polyolefins with one or more adhesive layers to improve adhesiveness to metal, epoxy resin, glass, ceramics, paper, wood, thermoplastic resin, fabric, non-woven fabric, varnishes and formica.

More specifically, the present invention refers to a method of co-extruding at least one polyolefin with one adhesive layer to improve the adhesive properties of polyolefins, especially in polyurethane foams, wherein a polar surface is imparted to the obtained adhesive polyolefin.

BACKGROUND OF THE INVENTION

Adhesion of different substrates to polyurethane (PU) foams produces articles for a large variety of technical applications when combining the foam properties (softness, elastic recovery, thermal insulation, acoustic insulation and low density) with the properties of various polyolefins, such as polyethylenes (PE) and polypropylenes (PP) which have high chemical resistance, low density, competitive costs and processability. Nevertheless, polyolefins are highly non-polar resins and their adhesion to PU foams usually have very low strength so that it is technical impracticable.

DESCRIPTION OF THE STATE OF THE ART

Among common forms of adhering polyolefins to PU foams there can be cited PU lamination with PP or PE films by using, for example, processes disclosed in GB Patent 1,127,600, GB Patent 1,453,872 ad U.S. Pat. No. 3,829,343. Such processes are known as doubling, wherein films are adhered to PU foam through temperature action, direct action on the film and addition of an adhesive intermediate film This film lamination process is widely used but the process is somewhat complex because it has an appropriate step, in addition to the fact that good adhesives do not always exhibit processing properties suitable for film formation, Furthermore, in the case of direct lamination with PE films, there is also the limitation of adhesion force due to the non-polar characteristic of the film, whereby a superficial treatment to ensure a good adhesion level is required.

Another usual form of solving such adhesion problem of polyolefins to PU foams and at the same enhancing the polyolefin properties to different solutions is the formulation of blends with resins having good adhesion to PU foams. In this sense, U.S. Pat. No. 4,500,596 teaches the use of a lamination process by modifying PP with chlorinated, sulfochlorinated polymers or addition of ethylene propylene diene monomer (EPDM), thereby imparting higher adhesion to PU and rendering the foams impervious in addition to producing a considerable variety of applications to asphalt substrates, for example. However, since it comprises formulating blends, the process involves a critical mixing step wherein PE and PP properties need high control to obtain a high level of dispersion. Another relevant fact is that the materials cited as modifiers are very expensive so that the application thereof is less competitive in the market place.

U.S. Pat. No. 5,834,126 describes an increase in the barrier to the expansion agents in refrigerators by inserting a functional layer comprised of polystyrene (PS) with modified polyolefins, wherein said layer is modified with anhydrides and acrylates, for example, to promote adhesion of PU to a high impact polystyrene (HIPS) or PS layer and compatibility with the polyolefin layer. It should be pointed out that the combination of materials described in the cited US Patent makes the solution complicated since it involves various different materials and therefore the need for using PS due to its thermoformability and characteristics of adhesion to PU is maintained.

Additionally, U.S. Pat. No. 4,659,618 refers to co-extruded structures necessarily from a PP/PE/PS blend to manufacture housings for refrigerators with adhesion to PU foams. All these embodiments taught by the cited US Patent comprises a structure prepared with polyolefins, which is added to one of its copolymers since an extra component is required for compatibility between phases, In addition, the formed structure consequently possesses high complexity of recyclability.

Another methodology widely used to promote adhesion of polyolefins to PU comprises applying curable primers by either ultraviolet (UV) radiation or temperature. In this context, GB Patent 976,382, GB Patent 1,139,350 and GB Patent 1,488,701 disclose the use of primers of unsaturated compounds, hydrated and halogenated salts which can be cured by temperature and pressure action to form different structures laminated with thermoplastics and rubbers with adhesion to PU. The greatest limitation in the use of primers is related to the production of volatiles in the temperature cure or solvent extraction, and also to the process complexity when UV-type cure is applied. In the case of volatiles, in addition to solvents, the primers may contain toxic substances having an odor that make various potential applications impracticable. Furthermore, the use of primers results in high costs and makes the application expensive since it is difficult to control the application to thin layers.

Hence, the methods disclosed in the prior art have higher complexity and limitations, some of which are summarized below:

1): Lamination: a film must be produced prior to its application to the PP or PE sheet, wherein heating and a second process are needed. For the carrying out of this method, time, stock and labor force are required;

2) Primers: there are problems of volatiles and solvents in the case of using solvent-based primers, said primers being ecologically and healthy inappropriate. Furthermore, in the case of UV cure, there will be needed high cost investment equipment; and 3) Polymer blends: they will require a significant rheological control of phases, Therefore, in view of the need for a simpler adhesion method without, however, losing the properties conferred by polyolefins to PU foams, the inventors of the present invention have developed a method which, in addition to being innovative, overcomes all drawbacks found in the processes known in the art, since by means of a single step an adhesive polyolefin ready suitable for application or for a molding process, wherein the adhesion of PU foam can be promoted.

DETAILED DESCRIPTION OF THE INVENTION

Figure 1:
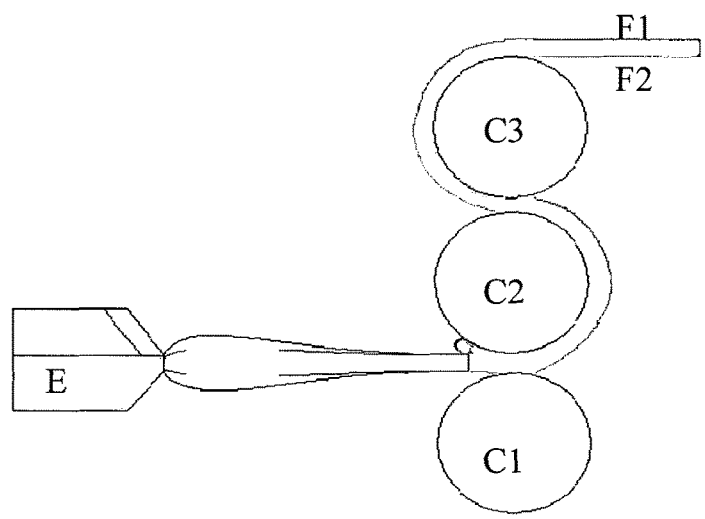
FIG. 1 is a schematic side view of the method used in the formation of the superficial finish in the co-extruded sheets (calendering)

The present invention refers to the co-extrusion of at least one polyolefin, or polyolefin blends, with one or more adhesive layers to increase the adhesive capacity of polyolefins to polyurethane foams in applications such as insulation, comfort, fabrics, etc.

By co-extrusion it is meant a simultaneous extrusion of different raw materials to obtain a product that combines two properties inherent in each material used in the process.

A co-extrusion carried out in accordance with the present invention promptly confers a strong adhesion on the inner layer of the co-extruded structure, between the adhesive layer and the polyolefin layer. Thus, a single and simple step produces an adhesived polyolefin suitable for application or for a molding process on which adhesion of a PU foam could be successfully promoted.

Examples of the possible polyolefins which can be used in this invention are: PP, PE, high density polyethylene (HDPE), linear low density polyethylene (LLDPE), low density polyethylene (LDPE), or polyolefin blends.

The adhesive in this application can be selected from any product having interaction with polyurethane foam due to its polarity which however has at the same time compatibility with those typically non-polar polyolefins. Among the possible adhesives which can be used in the present invention are: EVA, polyolefins grafted with acrylates, acrylic acid, itaconic acid, maleic acid, methacrylates, itaconic anhydrides, maleic anhydride, silanes, aminosilanes, amides, amines, azides, sulfonazides, chlorinated polymers, sulfonated polymers, fluorinated polymers or mixture thereof, or any other polar comonomer, in addition to copolymers of polyolefins with acrylates, acrylic acid, itaconic acid, maleic acid, methacrylates, itaconic anhydride, maleic anhydride, etc. or any other polar comonomer.

The adhesives may also be products of PE, HDPE, LLDPE, LDPE, EVA and PP modified by reactive extrusion or in reactor with maleic anhydride, itaconic anhydride, acrylic anhydride, methacrylates and other acrylates and co-extruded with polyolefins.

To increase the polar character and adhesion thereof to the substrate, other ingredients such as copolymers, primers, mineral fillers, organic and inorganic compounds, silanes, among other polar additives and mixtures thereof can be added to the adhesive.

It should be reminded that viscosity and fluidity of the co-extruded raw materials are important factors to the good performance of the method of the invention since they have a strong influence on the co-extrusion process. In this sense, analysis of viscosity versus frequency curves permits to achieve a better condition of the co-extrusion for the co-extruded polyolefin/adhesive product to obtain a viscosity ratio of polyolefin to adhesive in the range of $0.5 \leq \eta_{POL}/\eta_{POL} \leq 2$. To this effect, the tool for this process is the operation range of resins wherein EVA-based adhesives should be in the range of 175° C. and 220° C. by virtue of EVA degradation, for example.

Since by basic definition each material has its fluidity property measured at a specific temperature (PP at 230° C./2.16 Kg, PE and EVA at 190° C./2.16 Kg), a complete evaluation of the rheological behavior of the resin is required.

Due to the fact that the present invention uses ethylene vinyl acetate (EVA) copolymer as the adhesive to be co-extruded with the polyolefin, the vinyl acetate content in EVA is in the range of from 5 to 35%, the preferred range being 8 to 21%. The EVA used has a fluidity rate between 0.1 and 800 g/10 min, preferably 0.3 and 20 g/min and further more preferably between 1 and 10 g/10 min.

The adhesive thickness is in the range of from 05 to 20% of the total structure thickness, the preferred range being 1 to 10% of the final extruded structure thickness.

PU pressure formation reaches values above 0.1 bar and temperatures higher than 70° C., wherein the polyol/isocyanate mixture has an isocyanate excess in the ratio (polyol:isocyanate mass ratio) of 100:101 to 100:200.

Another factor that has a significant influence on the adhesion to PU is the technological nature of manufacture processes which produce products having different distributions of molar mass and polymeric chain branches.

Additionally, calendering, which is the molding process used in a step subsequent to the co-extrusion of multiple layers, permits that both surfaces present an elevated superficial finish or a higher roughness.

The superficial finish of the sheets is obtained by contact with calender rolls, where the molding of PU over PP particularly takes place when the sheets are at temperatures above 20° C. and lower than 70° C.

FIG. 1 shows the superficial finish formation system of co-extruded sheets in extruder (E). Said superficial finish formation system comprises a three-roll (C1; C2; C3) calender, wherein face 1 (F1) is laminated by contact with roll C2 and face 2 (F2) by contact with roll C3.

When a finish control is used, pressures between said rolls must be controlled. To obtain a high finish level on both faces, contacts with C2 and C3 should be intensified.

When the finish is carried out on only one of the faces, the contact with C3 is relieved, whereby roughness on this face is then increased. Thus, the EVA co-extruded layer (or any other applied adhesive) can have its roughness controlled by reducing contact or using a textured roll C3.

The adhesive layer—or the number of adhesive layers which have been extruded together with the polyolefin, according to the desired final application—can also be subjected to a subsequent corona, flame, plasma or any ionizing radiation treatment to further improve adhesion to PU.

EXAMPLES

The following examples illustrate the present invention and the obtained improvements of adhesion in different samples of polyolefins to PU foams. These examples are not intended to limit the claimed scope of protection but rather give a better comprehension of the present invention.

Tested Materials

TABLE 1

Properties of the materials tested in the solution.

| Material | Fluidity Rate (g/10 min) | Vinyl Acetate Content (wt %) |
|---|---|---|
| EVA TN 2020 | 2 | 8 |
| EVA TN 2005 | 0.8 | 13 |
| EVA TN 2006 | 0.7 | 18 |
| PP heterophasic copolymer | 3.0 | — |
| PP homopolymer | 3.5 | — |

Description of Analysis

Samples were prepared by a three-layer coextrusion in Davis Standard 75 mm25 MV, 54IN45H and 35IN3 extruders. The finish form of the sheets was determined by calendering pressure exerted on the co-extrusion system after sheet co-extrusion.

To substantiate the technical solution provided by the present invention, the adhesive layer has been generated through the following modes:

high finishing, adhesive layer with excellent superficial finish on one face only;

adhesive layer having higher roughness and with the possibility of a higher contact area.

Small 80×80 mm sections of samples were cut. Said sections were maintained at a temperature of at least 50° C., followed by foaming with polyol and isocyanate in a polyol isocyanate mass ratio of 100:108 on the face having the adhesive layer (1), according to FIG. 2.

Figure 2:
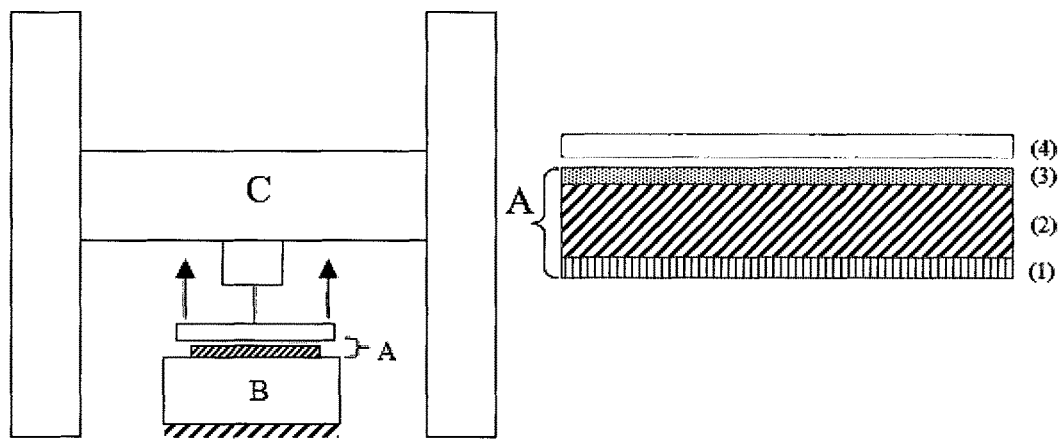
FIG. 2 is a schematic side view of the method used in the adhesion test.

The coextruded solution into two (1 and 2) or three (1, 2 and 3) layers, where the layer (1) preferably comprised of EVA is responsible for the adhesion, was tested according to an adhesion test scheme shown in FIG. 2, where the PU foam, structure B, is in contact with the adhesive layer (1).

The layer (2) also called outer layer of the coextruded structure is the main polyolefin layer, preferably PP or PE, and the layer (3) is the optional functional layer opposite to the adhesive layer (1), and it can be any polyolefin or polyolefin blend adhered to the main polyolefin layer (2). If co-extruded together with said layers (1) and (2), the layer (3) is intended to improve properties, for example, optical (glowing), mechanic, color, touch properties and adhesion properties. The number of optional layers may vary according to the desired application.

After the foam curing time, an adhesive tape (4) for test with adhesion strength of 200 cN is placed over the sample, thus contacting layer (2) and/or layer (3) according to the desired application.

Further in FIG. 2 the measurement of the force for detachment of the PU foam layer in an universal mechanical testing equipment (C) is carried out, The detachment force obtained from each test is subsequently compared to the adhesion forces of usual application samples as well as reference forces (adhesion forces of co-extruded PP layers).

In all cases, the adhesion force between the co-extruded PP and adhesive layers, with no PU expansion on the surface, showed to be stronger than the adhesion with the adhesive tape used in tests.

Table 2 below lists adhesion force values:

TABLE 2

Processing conditions and polyurethane adhesion force.

| Samples | | Finish of the layer in contact with PU | Adhesive layer thickness (total % of structure) | Polyol:isocyanate mass ratio | Adhesion force (N) |
|---|---|---|---|---|---|
| 1a | PP homopolymer sheet | rough | — | 100:108 | 0 |
| 1b | PP homopolymer sheet | smooth | — | 100:108 | 0 |
| 1c | PP homopolymer sheet | rough | — | 100:108 | 3 |
| 2 | Sheet of PP co-extruded with EVA | smooth | 3.5 | — | >200 |
| 3 | PS sheet | rough | 5 | 100:108 | 30 |
| 4 | PP + EVA TN 2020 sheet[1] | smooth | 3.5 | 100:108 | 13 |
| 5 | PP + EVA TN 2020 sheet | rough | 3.5 | 100:108 | 8 |
| 6 | PP + EVA TN 2005 sheet[2] | rough | 3.5 | 100:108 | 19 |
| 7 | PP + EVA TN 2006 sheet[3] | rough | 3.5 | 100:108 | 30.4 |
| 8 | PP + EVA TN 2020 sheet | smooth | 7 | 100:108 | 15 |
| 9 | PP + EVA TN 2020 sheet | rough | 3.5 | 100:145 | 5 |
| 10 | PP + EVA TN 2006 sheet[2] | smooth | 3.5 | 100:108 | 42 |

[1] 8 wt % of vinyl acetate content in EVA TN 2020
[2] 13 wt % of vinyl acetate content in EVA TN 2005
[1] 18 wt % of vinyl acetate content in EVA TN 2006

From tests 1a and 1b, it is observed that in none of the test conditions the PP adhesion to PU was high. When the PP copolymer sheet has a higher roughness, adhesion reaches a low valor of 3 N, where this has been shown to be the best test condition in PP, without using the technical solution of the present application.

Example 1 (Comparative Example)—Effect of the PP Nature—Samples 1b and 1c

Figure 3:
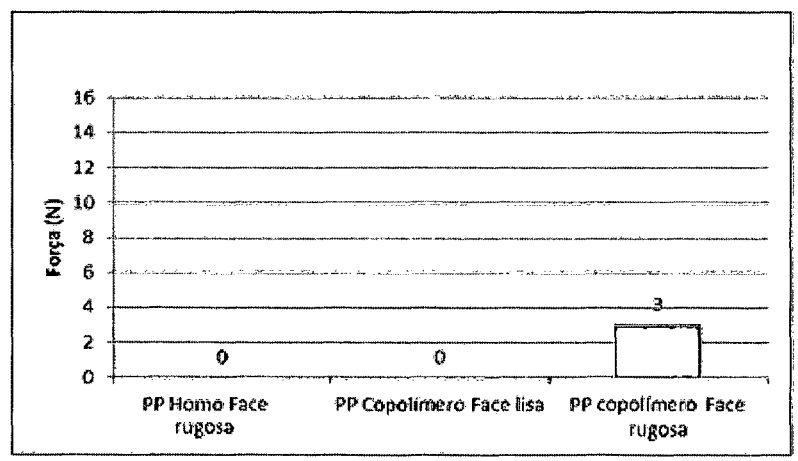
FIG. 3 is a graph of the force of adhesion of different PP to PU.

It can be noted from graph in FIG. 3 that even when using PP with rubber phase (PP copolymer) there is not a significant increase in the adhesion to PU.

Example 2 Effect of EVA Content on the Adhesion to PU—Samples 5, 6, and 7

Figure 4:
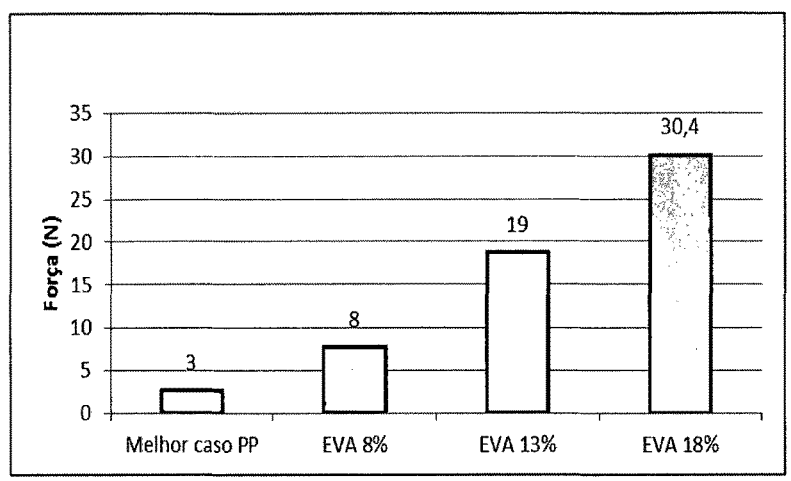
FIG. 4 is a graph showing the effect of acetate content in the (adhesive) rough surface of EVA on the adhesion to PU.

From Table 2 and graph of FIG. 4 it can be noted that upon increasing the vinyl acetate content in the EVA solution used, an increase in the adhesion force to PU due to an increase in the resin polarity occurred. The adhesion force values are ten times higher when compared to the value of the best PP case.

Example 3—Effect of Roughness of the EVA Layer on the Adhesion to PU—Samples 4 and 5

Figure 5:
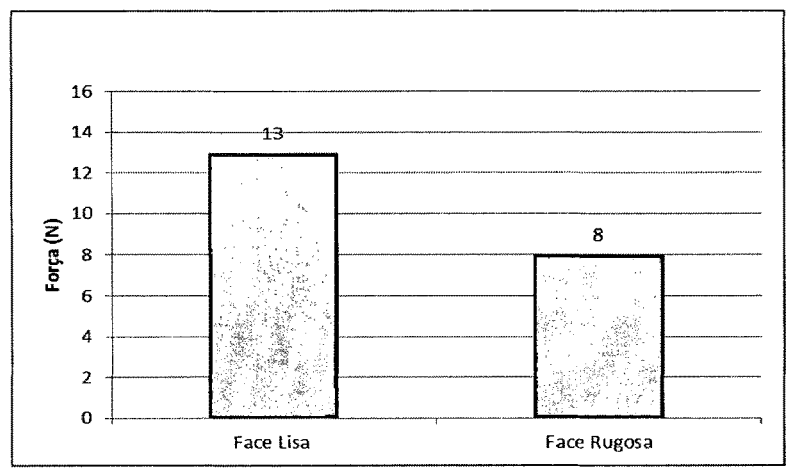
FIG. 5 is a graph showing the roughness effect of EVA (adhesive) on the adhesion to PU.

Contrary to PP (1b and 1c) in which some foam anchoring occurs in the PU foam when roughness increases, the EVA layer without superficial finish has PU adhesion force values lower than the values of the layer having a good finish, as can be observed from graph of FIG. 5. This is probably due to the effect of air microbubbles retained on the surface. And yet the adhesion values are at least 2.5 times higher than the value of the best PP case shown in Table 2.

Example 4—Effect of the EVA Layer Thickness on the Adhesion to PU—Samples 4 and 8

Figure 6:
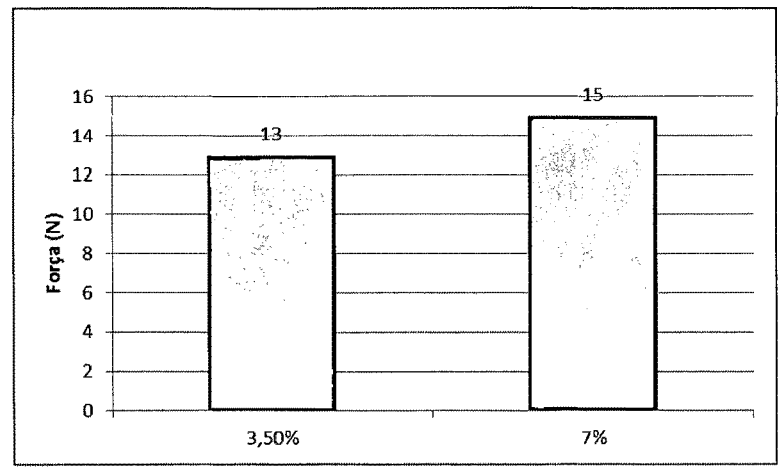
FIG. 6 is a graph showing the effect of the adhesive (EVA) layer on the adhesion to PU.

From a graph of FIG. 6, it can be observed that even with thicker EVA layers no significant variation in the adhesion to PU occurs. Thus despite the fact that EVA is a material less rigid than PP, such a property does not have any effect on the adhesion force based on the coextrusion of the layers. Moreover, the adhesion force between PP and EVA is higher than the adhesion force with adhesive tape and in no case delamination between the layers should occur.

Example 5—Effect of the PU Composition on the Adhesion to PP/EVA—Samples 5 and 9

Figure 7:
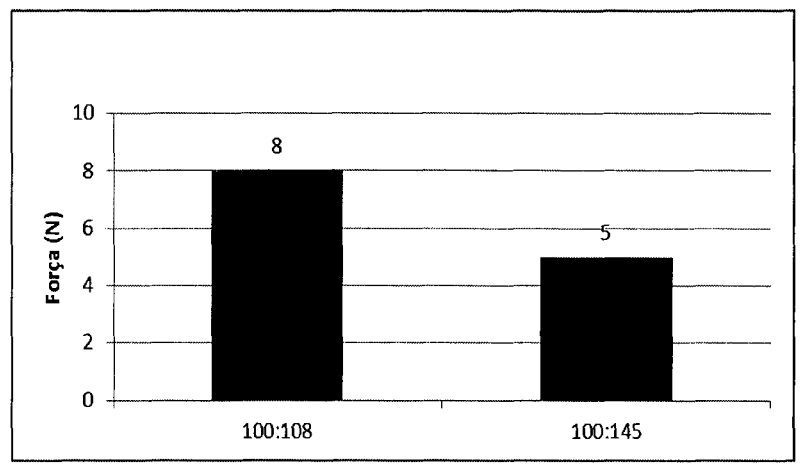
FIG. 7 is a graph showing the effect of the PU composition on the adhesion to PP/EVA.
Figure 8:
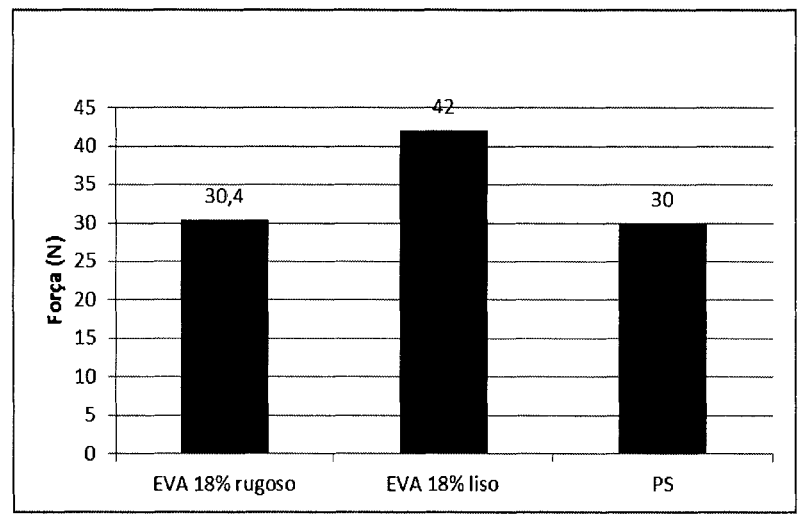
FIG. 8 is a graph showing the optimized effect resulting from the adhesive (EVA) combination with a high content of acetate and smooth surface on adhesion to PU.

From a graph of FIG. 7, it can be observed that variations in the PU composition are not effective in altering the adhesion force values between the layers. This allows for robustness of application once there is a good performance thereof when process oscillations occur.

Example 6—Optimization of Adhesion to PU—Samples 7 and 10

According to a graph in Figure, sample 10 exhibits an optimized adhesion force of PP/EVA to PU, which is at a level higher than that obtained with PS (sample 3). A 14-fold gain in the adhesion force value on PU is significant for a new application with PP/EVA, making it favorable.

The adhesived polyolefin disclosed by the method of the present invention shows at least one polar surface and can be used for adhesion in metal, epoxy resin, glass, ceramics, paper, wood, thermoplastic resin, fabric, non-woven fabrics, varnishes and formica. Preferably, the adhesived polyolefin is used for adhesion in polyurethane in foam form, with polyol:isocyanate ratio between 100:101 and 100:200.

After a description of examples of the preferred embodiments has been provided, it should be realized that the scope of the present invention encompasses other possible variations which are only limited by the contents of the appended claims, including possible equivalents

What is claimed is:

1. A method for preparing a product comprising a polyolefin and an adhesive, wherein the product is a co-extruded structure including a polyolefin layer and an ethylene vinyl acetate (EVA) adhesive layer, the method further comprising molding a polyurethane foam on the adhesive layer of the co-extruded structure, wherein molding the polyurethane foam comprises combining a polyol and an isocyanate in a mold, and curing the combined material, wherein the viscosity ratio between the polyolefin and the adhesive is from 0.5 to 2, and the vinyl acetate content in EVA is 8 to 21 wt %, and
wherein said EVA has a fluidity rate between 0.1 and 800 g/10 min measured at 190° C./2.16 Kg, and the adhesive layer of the co-extruded structure is subjected to a treatment selected from corona, flame, plasma, radiation and combinations thereof.

2. The method as recited in claim 1, wherein the polyolefin is selected from the group consisting of PP, PE, HDPE, LDPE, LLDPE and combinations thereof.

3. The method as recited in claim 1, wherein said adhesive further comprises a material selected from the group consisting of copolymers, primers, mineral fillers, organic or inorganic compounds, silanes, polar additives and combinations thereof.

4. The method as recited in claim 1, wherein the adhesive layer thickness is between 0.5 and 20% of the co-extruded structure.

5. The method as recited in claim 1, wherein the co-extruded structure is a calendered co-extruded structure.

6. The method as recited in claim 5, wherein the calendered co-extruded structure has a rough superficial finish.

7. The method as recited in claim 5, wherein the calendered co-extruded structure has a smooth superficial finish.

8. The method as recited in claim 1, wherein the molding of polyurethane foam in the co-extruded structure takes place with the co-extruded structure at temperatures between 20° C. and 70° C.

9. The method as recited in claim 1, wherein the polyol and the isocyanate are combined in a polyol:isocyanate mass ratio between 100:101 and 100:200.

10. The method as recited in claim 1, wherein molding takes place in a pressure above 0.1 bar and a temperature above 70° C.

* * * * *